(12) United States Patent
Kim et al.

(10) Patent No.: US 12,498,454 B2
(45) Date of Patent: Dec. 16, 2025

(54) METHOD AND APPARATUS FOR GENERATING DECEPTION TARGET INFORMATION FOR DECEPTION JAMMING OF PASSIVE RADAR

(71) Applicant: AGENCY FOR DEFENSE DEVELOPMENT, Daejeon (KR)

(72) Inventors: San Hae Kim, Daejeon (KR); In Hwan Jeong, Daejeon (KR); Hyun Gyu Kwak, Daejeon (KR); Jong Hwan Lee, Daejeon (KR); Kyu Ha Song, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 554 days.

(21) Appl. No.: 18/050,410

(22) Filed: Oct. 27, 2022

(65) Prior Publication Data
US 2023/0400550 A1    Dec. 14, 2023

(30) Foreign Application Priority Data
Jun. 8, 2022   (KR) .................. 10-2022-0069803

(51) Int. Cl.
*G01S 7/38* (2006.01)
*G01S 7/40* (2006.01)

(52) U.S. Cl.
CPC . *G01S 7/38* (2013.01); *G01S 7/40* (2013.01)

(58) Field of Classification Search
CPC ..................................... G01S 7/38; G01S 7/40
See application file for complete search history.

(56) References Cited

U.S. PATENT DOCUMENTS

| | | | |
|---|---|---|---|
| 2019/0033427 A1* | 1/2019 | Cornic | .................. F41H 11/02 |
| 2023/0204716 A1* | 6/2023 | Ginzburg | ............. H01Q 15/148 |
| | | | 342/14 |

FOREIGN PATENT DOCUMENTS

| | | |
|---|---|---|
| KR | 10-2234419 B1 | 3/2021 |
| KR | 10-2021-0079897 A | 6/2021 |
| KR | 10-2022-0029111 A | 3/2022 |

OTHER PUBLICATIONS

Notice of Allowance in KR Application No. 10-2022-0069803 dated May 20, 2025 and English translation.

* cited by examiner

*Primary Examiner* — William Kelleher
*Assistant Examiner* — Hailey R Le
(74) *Attorney, Agent, or Firm* — Knobbe, Martens, Olson & Bear, LLP

(57) ABSTRACT

A method for generating deception target information is proposed. The method may include setting third transmission sources pre-selected based on movement path of a jammer as jamming channels, setting a passive radar reference position according to presence or reliability of prior information on position of the passive radar. The method may also include grouping set jamming channels into groups according to operating environment and purpose and analyzing a deception target settable area based on positions of the third transmission sources, the passive radar reference position, and a movement path of the actual target. The method may further include setting a deception target movement path and deriving the deception target information based on the passive radar reference position, the positions of the third transmission sources, the movement path, and a movement path of a virtual deception target for each deception target movement path.

20 Claims, 11 Drawing Sheets

METHOD AND APPARATUS FOR GENERATING DECEPTION TARGET INFORMATION FOR DECEPTION JAMMING OF PASSIVE RADAR

CROSS-REFERENCE TO RELATED APPLICATION

This application claims priority to Korean Patent Application No. 10-2022-0069803 filed on Jun. 8, 2022. The entire contents of the application on which the priority is based are incorporated herein by reference.

TECHNICAL FIELD

The present disclosure relates to an apparatus for generating deception target information for deception jamming of a passive radar and a method for generating deception target information by the deception target information generating apparatus.

BACKGROUND

Passive radar estimates target information such as a time difference of arrival (TDOA) and a frequency difference of arrival (FDOA) between a reference signal that directly receives signals emitted from a plurality of third transmission sources, such as FM radio broadcasting, terrestrial digital multimedia broadcasting (DMB), and digital TV broadcasting, and a target reflection signal that is received by being reflected by a moving target, and detects a target location using the estimated target information.

Since the passive radar does not have direct radiation signals, covert monitoring is possible, and because it does not have transmission equipment, it can be relatively miniaturized, which enables mobile deployment and operation. Therefore, researches regarding the passive radar are being actively conducted all over the world.

SUMMARY

According to one embodiment, there is provided an apparatus and a method for generating deception target information for passive radar deception jamming capable of performing the deception jamming regardless of presence or absence of location information of the passive radar.

The problems to be solved of the present disclosure are not limited to those mentioned above, and other problems to be solved that are not mentioned will be clearly understood by those of ordinary skill in the art to which the present disclosure belongs from the following description.

In accordance with a first aspect of the present disclosure, there is provided a method for generating deception target information which is performed by an apparatus for generating deception target information, the method including: setting a plurality of third transmission sources pre-selected based on a movement path of a jammer as jamming channels; setting a passive radar reference position to be used as a reference for deception jamming of a passive radar according to presence or reliability of prior information on a position of the passive radar for each of the set jamming channels; grouping the set jamming channels into a single group or a plurality of groups according to an operating environment and an operating purpose; analyzing a deception target settable area based on positions of the third transmission sources, the passive radar reference position, and a movement path of the actual target for each group; setting a deception target movement path in a movement time of the actual target in the deception target settable area analyzed for each passive radar reference position and each jamming channel group; and deriving deception target information during the movement time of the actual target based on the passive radar reference position, the positions of the third transmission sources of the corresponding group, the movement path of the actual target, and a movement path of a virtual deception target for each deception target movement path.

In accordance with a second aspect of the present disclosure, there is provided an apparatus for generating deception target information, including: a data acquisition unit that acquires various data for generating deception target information; and a processor for generating deception target information based on the various data acquired by the data acquisition unit, wherein the processor is configured to: set a plurality of third transmission sources pre-selected based on a movement path of a jammer among the various data as jamming channels; set, for each of the set jamming channels, a passive radar reference position to be used as a reference for deception jamming of a passive radar according to presence or reliability of prior information on a position of the passive radar among the various data; group the set jamming channels into a single group or a plurality of groups according to the operating environment and operating purpose among the various data; analyze the deception target settable area based on positions of the third transmission sources, the passive radar reference position, and a movement path of the actual target for each group; set a deception target movement path in a movement time of the actual target in the deception target settable area analyzed for each passive radar reference position and each jamming channel group; and derive deception target information during the movement time of the actual target based on the passive radar reference position, the positions of the third transmission sources of the corresponding group, the movement path of the actual target, and a movement path of a virtual deception target for each deception target movement path.

In accordance with a third aspect of the present disclosure, there is provided a non-transitory computer-readable recording medium storing a computer program including instructions for, when the program is executed by a processor, allowing the processor to perform a method, the method including: setting a plurality of third transmission sources pre-selected as jamming channels based on a movement path of a jammer as jamming channels; setting a passive radar reference position to be used as a reference for deception jamming of a passive radar according to presence or reliability of prior information on a position of the passive radar for each of the set jamming channels; grouping the set jamming channels into a single group or a plurality of groups according to an operating environment and an operating purpose; analyzing a deception target settable area based on positions of the third transmission sources, the passive radar reference position, and a movement path of the actual target for each group; setting a deception target movement path in a movement time of the actual target in the deception target settable area analyzed for each passive radar reference position and each jamming channel group; and deriving deception target information during the movement time of the actual target based on the passive radar reference position, the positions of the third transmission sources of the corresponding group, the movement path of the actual target, and a movement path of a virtual deception target for each deception target movement path.

If the deception jamming is performed using the deception target information generated according to an embodiment of the present disclosure, a plurality of false targets synchronized for each third transmission source used in the passive radar are generated so that the passive radar detects the location of the plurality of false targets, and thus, the operator cannot easily recognize whether the jamming is present on the operation screen of the passive radar.

Further, the false target can be generated in the passive radar regardless of the presence or absence of prior information on the location of the passive radar, and a number of false targets can be generated by applying various methods, and thus, the deceptive effect on the passive radar can be greatly increased.

In addition, by using this, the survivability of friendly fighters can be greatly improved in an area where the passive radar is operated, and it can be used in defense fields such as a radar and an electronic warfare.

DETAILED DESCRIPTION

Figure 1:
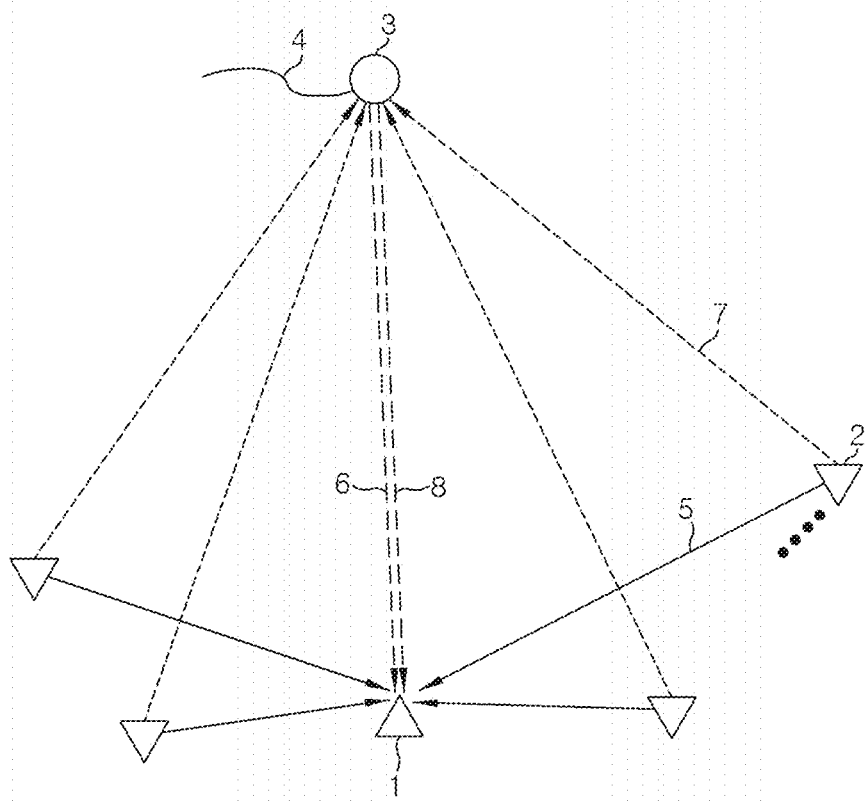
FIG. 1 is a diagram illustrating an operating environment of a passive radar and a jammer to which an apparatus and a method for generating deception target information for passive radar deception jamming according to an embodiment of the present disclosure can be applied.

In order to maximize the survivability of a fighter plane in an environment in which the passive radar is operated, it may be necessary to develop a passive radar jamming technique. The passive radar jamming technique researched in the past emits interference signals such as noise and tone to the frequency channel used by a third transmission source used by the passive radar for operation and prevents it from estimating target information about the transmission source.

However, in the case of jamming using interference signals such as noise and tone, the operator can easily recognize the jamming situation on the operation screen of the passive radar, so it is possible to avoid jamming by changing the third transmission source used for operation. Therefore, for effective jamming of the passive radar, a deception jamming capability that generates a false target that prevents the operator from recognizing the jamming is required.

The passive radar deception jamming technique is a technology that generates a false target on the operation screen of the passive radar by emitting a deception jamming signal from a jammer mounted on a moving target. To this end, a deception jamming signal for generating the false target in the passive radar must be generated and radiated from the jammer based on prior information such as the position of the passive radar. However, it was very difficult to acquire accurate location information of the passive radar operated by moving and deployed secretly, which made it difficult for the deception jamming.

Advantages and features of the present disclosure, and a method of achieving them will become apparent with reference to an embodiment described later together with the accompanying drawings. However, the present disclosure is not limited to an embodiment disclosed below, but may be implemented in a variety of different forms. That is, the embodiment is provided to ensure that descriptions of the present disclosure are complete and to fully inform a scope of the invention to a person with ordinary knowledge in a technical field to which the present disclosure belongs, and the invention is only defined by the scope of claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

As used herein, the term 'unit' means software or a hardware component such as an FPGA or ASIC, and 'unit' performs certain roles. However, 'unit' is not meant to be limited to software or hardware. The 'unit' may be configured to reside on an addressable storage medium or may be configured to operate one or more processors. Thus, as an example, 'unit' refers to components such as software components, object-oriented software components, class components, and task components, processes, functions, properties, procedures, subroutines, segments of program code, drivers, firmware, microcode, circuitry, data, databases, data structures, tables, arrays and variables. Functions provided within components and 'units' may be combined into a smaller number of components and 'units' or further divided into additional components and 'units'.

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a diagram illustrating an operating environment of a passive radar and a jammer to which an apparatus and a method for generating deception target information for passive radar deception jamming according to an embodiment of the present disclosure can be applied. With reference to FIG. 1, an environment in which the device for generating deception target information for passive radar deception jamming according to the embodiment of the present disclosure can be operated will be described.

A passive radar 1 is disposed, and the disposed passive radar 1 detects the position of the target 3 by using reference signals 5 directly received by the passive radar 1 from a plurality of surrounding third transmission sources 2, and by using a target reflection signal 6 received by the passive radar 1 from the target 3 equipped with a jammer.

On the other hand, the jammer mounted on the target 3 performs a deception jamming that generates a false target in the passive radar 1 by generating a deception jamming signal 8 based on a jammer reception signal 7 in which the signal emitted from a third transmission source 2 is received by the target 3, and emitting the generated deception jamming signal 8.

Figure 2:
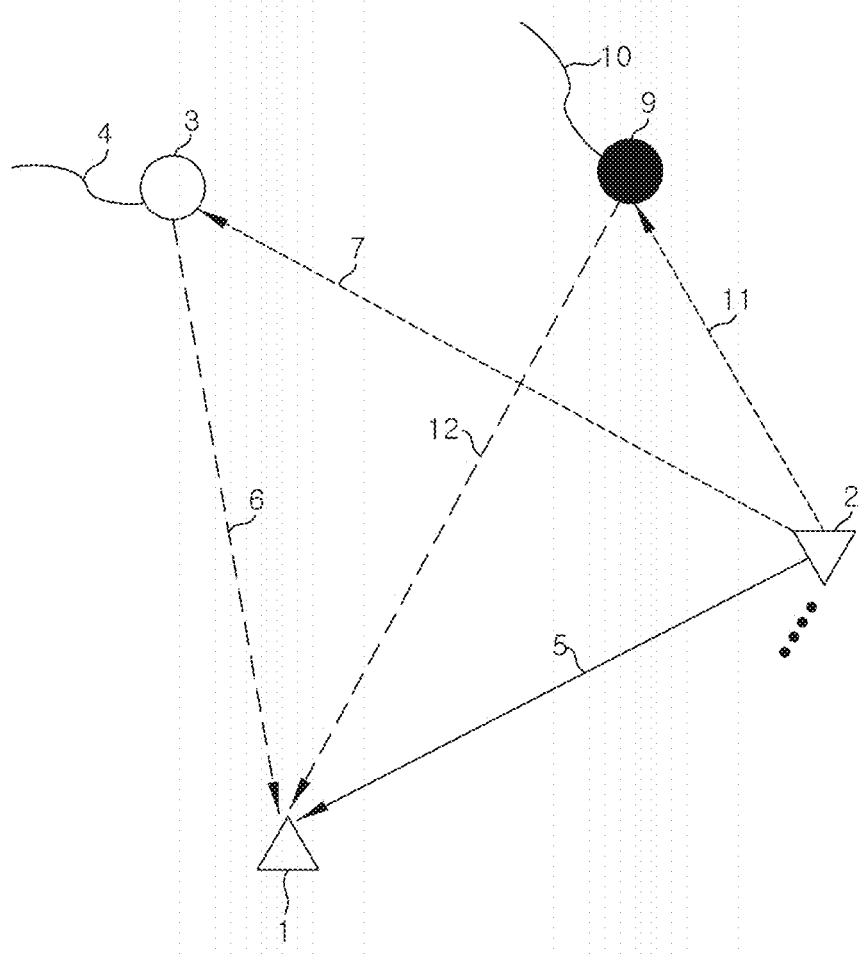
FIG. 2 is a diagram for explaining deception target information that can be generated through an apparatus and a method for generating deception target information for passive radar deception jamming according to the embodiment of the present disclosure.

FIG. 2 is a diagram for explaining deception target information that can be generated through an apparatus and a method for generating deception target information for passive radar deception jamming according to the embodiment of the present disclosure. Referring to FIG. 2, deception target information for generating the deception jamming signal for the passive radar deception jamming will be described.

The deception target information includes a time delay ($T_J$) and a frequency offset ($F_J$) derived using Equations 1 and 2 below, based on the position of the passive radar 1, the position of the third transmission source 2 used by the passive radar 1, the location of the actual target 3, and the position of a virtual deception target 9 that is intended to generate the false target.

$$T_J = \Delta T_{decep} - \Delta T_{true} \quad \text{[Equation 1]}$$

$$F_J = \Delta F_{decep} - \Delta F_{true} \quad \text{[Equation 2]}$$

Here, $\Delta T_{true}$ and $\Delta F_{true}$ are the time difference of arrival (TDOA) and the frequency difference of arrival (FDOA) between the reference signal 5 directly received by the passive radar 1 from the third transmission source 2 and the target reflected signal 6 that is received by the passive radar 1 reflected by the actual target 3 after being emitted from the third transmission source 2. $\Delta T_{decep}$ and $\Delta F_{decep}$ are the time difference of arrival (TDOA) and the frequency difference of arrival (FDOA) between the reference signal 5 directly received by the passive radar 1 from the third transmission source 2 and the deception target reflected signal 12 that is received by the passive radar 1 reflected by the virtual deception target 9 after being emitted from the third transmission source 2.

If such deception target information is synchronized between a plurality of third transmission source channels and generated for each transmission source channel, the jammer mounted on the target 3 receives the jammer reception signal 7 in which the third transmission source radiation signal is received by the target 3, the frequency shift is performed as much as the frequency offset ($F_J$) on the operating frequency of the corresponding transmission source, and the frequency-shifted deception jamming signal 8 is radiated after the time delay ($T_J$). Thereafter, the passive radar 1 receives the deception jamming signal 8 including the deception target information, estimates the false target information for each source channel of the passive radar 1, and detects the location of the false target based on the false target information for each of the plurality of source channels.

Figure 3:
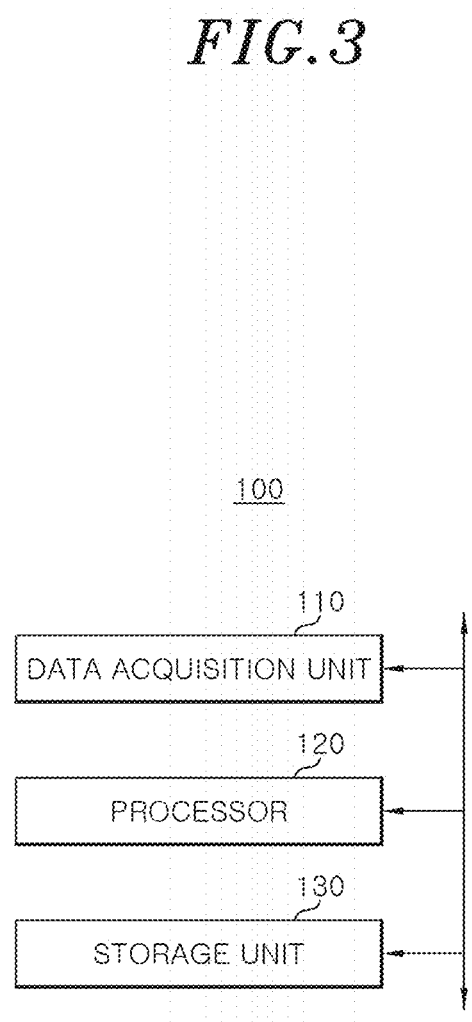
FIG. 3 is a block diagram of an apparatus for generating deception target information for passive radar deception jamming according to the embodiment of the present disclosure.

FIG. 3 is a block diagram of an apparatus for generating deception target information for passive radar deception jamming according to the embodiment of the present disclosure.

Referring to FIG. 3, the apparatus 100 for generating deception target information according to the embodiment may include a data acquisition unit 110 and a processor 120, and may further include a storage unit 130.

The data acquisition unit 110 acquires various data necessary for generating the deception target information, and provides the acquired various data to the processor 120.

The processor 120 generates deception target information based on various data acquired by the data acquisition unit 110. The processor 120 sets a plurality of third transmission sources pre-selected based on the movement path of the jammer among various data as jamming channels, sets the passive radar reference position to be used as a reference for deception jamming of the passive radar according to whether or not there is prior information on the position of the passive radar or according to the reliability among various data for each set jamming channel, divides the set jamming channels into single or multiple groups according to the operating environment and operating purpose among various data, analyzes the deception target settable area based on the position of the third transmission source 2, the passive radar reference position and the actual target movement path for each divided group, sets the deception target movement path as much as the actual target movement time in the deception target settable area analyzed for each passive radar reference position and each jamming channel group, and derives the deception target information during the actual target movement time based on the passive radar reference position for each deception target movement path, the position of the third transmission source 2 in the group, the actual target movement path and the virtual deception target movement path.

When setting the passive radar reference position, if the reliability of the prior information on the passive radar position is equal to or greater than a preset threshold value, the processor 120 may set the passive radar reference position to be fixed based on the prior information. The processor 120 may set a plurality of passive radar reference positions based on the prior information if the reliability of the prior information on the position of the passive radar is less than a preset threshold value when setting the passive radar reference position, may set a number of passive radar secondary reference positions where the passive radars can be located, and may set the movement path of the passive radar by moving the passive radar reference position along the movement path of the target equipped with the jammer while maintaining the direction and the specific distance with respect to the secondary reference position of the passive radar. When setting the passive radar reference position, if there is no prior information on the position of the passive radar, the processor 120 may arbitrarily set a plurality of passive radar reference positions, and then may set the movement path of the passive radar by moving the reference position of the passive radar along the movement path of the target equipped with the jammer while maintaining the specific direction and the specific distance. Here, the specific direction may be determined in consideration of the expected position (or direction) of the passive radar or a position (or direction) in which the passive radar cannot be installed. Alternatively, by setting the passive radar reference position at an isotropic interval, the specific direction may be determined in consideration of the omnidirectional direction with respect to the target. Alternatively, the specific direction may be set based on the heading direction of the target according to the movement of the target equipped with the jammer. When the processor 120 divides into a single or a plurality of groups, the processor 120 may divide into a different number of groups for each reference passive radar set according to an operation purpose. When analyzing the deception target settable area, the processor 120 may perform at the instantaneous position of the target. The processor 120 may consider the deception speed and deception height of the deception target when setting the deception target movement path. When deriving the deception target information, if the deception target non-settable area is partially or entirely included in the deception target movement path, the processor 120 may replace the time delay and frequency offset values of the included time point and the corresponding jamming channel with arbitrary value or random value. The processor 120 may perform the exceptional deception target information generation procedure in parallel with the procedure of setting the passive radar reference position and subsequent procedure after setting the plurality of third transmission sources 2 as the jamming channels, and the exceptional deception target information generation procedure may first set the movement path of the deception target at the desired location of the operator, perform jamming channel grouping, analyze the passive radar settable area for each jamming channel group, and then perform the passive radar reference position setting within the passive radar settable area, and based on this, it is possible to derive a time delay ($T_J$) and a frequency offset ($F_J$) by generating deception target information.

Figure 4:
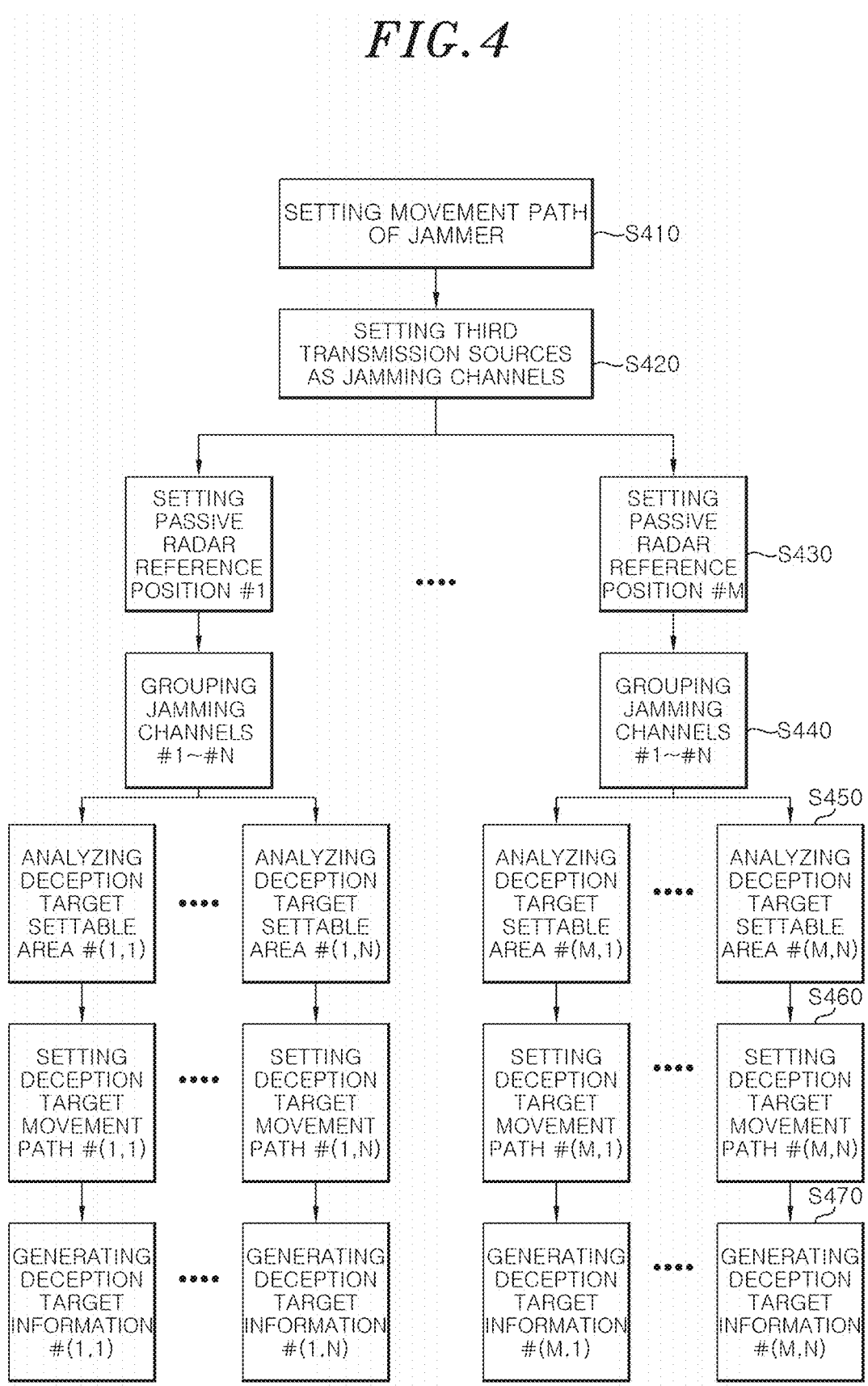
FIG. 4 is a flowchart illustrating a method of generating deception target information performed by an apparatus for generating deception target information for passive radar deception jamming according to the embodiment of the present disclosure.

FIG. 4 is a flowchart illustrating a method of generating deception target information performed by an apparatus for generating deception target information for passive radar deception jamming according to the embodiment of the present disclosure. A method of generating deception target information for generating a deception jamming signal for passive radar deception jamming will be described with reference to FIG. 4.

First, the movement path of the jammer is set in advance according to the operation concept or operation of a target such as a fighter plane equipped with a jammer (S410), and then a plurality of pre-selected third transmission sources (L third transmission sources) that are highly likely to be used by the passive radar are set as the jamming channels (S420).

In the present disclosure, in order to perform deception jamming regardless of the presence or absence of location information of the passive radar 1, the passive radar reference position is set regardless of the presence and reliability of prior information on the location of the passive radar 1 and used to generate deception target information. In addition, a plurality of passive radar reference positions (M passive radar reference positions) may be used to jam a plurality of passive radars or to increase the effect of deception jamming (S430).

Depending on the operating environment, etc., the passive radar reference positions can be set in various ways. Some operating environments will be described as examples.

Figure 5:
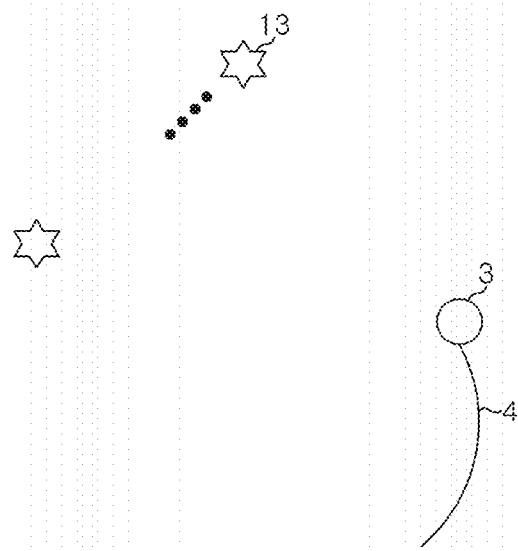
FIG. 5 is a diagram illustrating an example of setting a passive radar reference position according to the embodiment of the present disclosure.

As the operating environment 1, if there is prior information on the position of the passive radar to be jammed, a plurality of fixed passive radar reference positions 13 may be set based on the prior information on the position of the passive radar as shown in FIG. 5.

Figure 6:
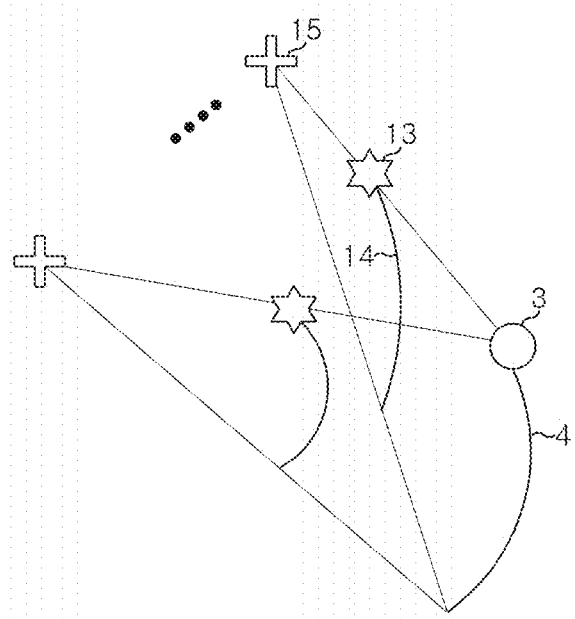
FIG. 6 is a diagram illustrating an example of setting a passive radar movement path based on a passive radar secondary reference position according to the embodiment of the present disclosure.

As the operating environment 2, if the reliability of the prior information on the position of the passive radar 1 to be jammed is low, as shown in FIG. 6, a plurality of passive radar reference positions 13 may be set based on the prior information on the position of the passive radar 1. In addition, by setting a plurality of passive radar secondary reference positions 15 in which the passive radar can be located, the moving path 14 of the passive radar 1 can be set by moving along the moving path 4 of the target 3 equipped with the jammer while maintaining a direction and a specific distance of the passive radar reference positions 13 with respect to the passive radar secondary reference positions 15.

Figure 7:
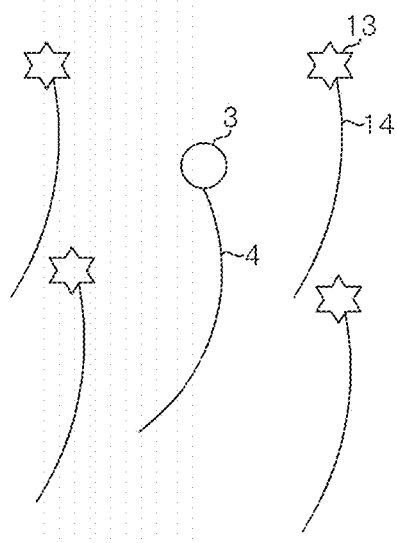
FIG. 7 is a diagram illustrating an example of setting a passive radar movement path based on a jammer movement path according to the embodiment of the present disclosure.

As the case of operation environment 3, if there is no prior information on the position of the passive radar 1 to be jammed, as shown in FIG. 7, after arbitrarily setting a plurality of passive radar reference positions 13, the movement path 14 of the passive radar 1 may be set by moving the passive radar reference positions 13 along the movement path of the target 3 equipped with the jammer while maintaining a specific direction and a specific distance. Here, the specific direction may consider the expected position (or direction) of the passive radar 1 or a position (or direction) where the passive radar 1 cannot be installed. In addition, as in the example of FIG. 7, by setting the passive radar reference positions 13 at an isotropic interval, the omnidirectional direction can be considered with respect to the target 3. In addition, according to the movement of the target 3 equipped with the jammer, the specific direction may be set based on the heading direction of the target 3.

Figure 8:
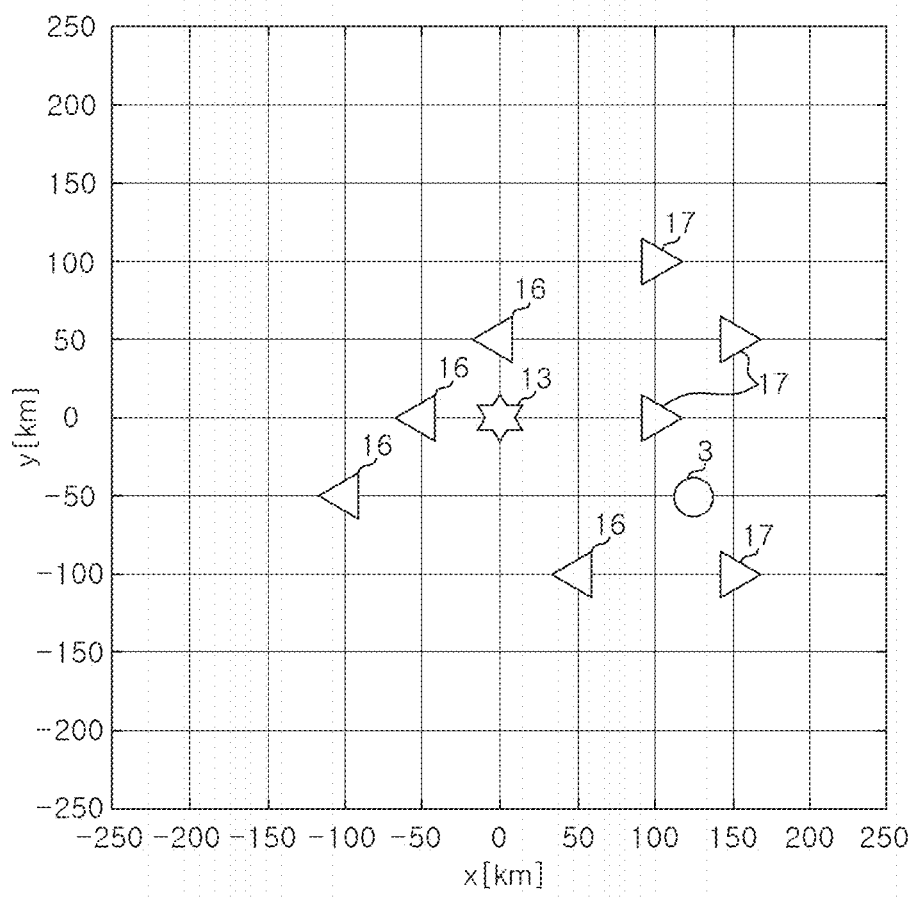
FIG. 8 is a diagram illustrating an example of jamming channel grouping according to the embodiment of the present disclosure.

In this way, after setting the position of the passive radar 1, jamming channel grouping is performed. The jamming channel grouping is a process of dividing the third transmission source pre-selected as the jamming channels into a single or a plurality of groups (N groups) according to an operating environment and an operating purpose (S440). If dividing into a plurality of groups through this process, the deception target settable area derived as a result of the deception target settable area analysis (S450) for the subsequent process of the deception target movement path setting (S460) can be expanded, and it is possible to obtain the effect of increasing the number of false targets in the position detection result of the passive radar 1 by performing the deception target movement path setting (S460) for each jamming channel group. In addition, it can be divided into a different number of groups for each reference passive radar set according to the purpose of operation. FIG. 8 shows an example in which the third transmission source jamming channels are divided into two groups 16 and 17 in one fixed passive radar reference position 13.

Figure 9:
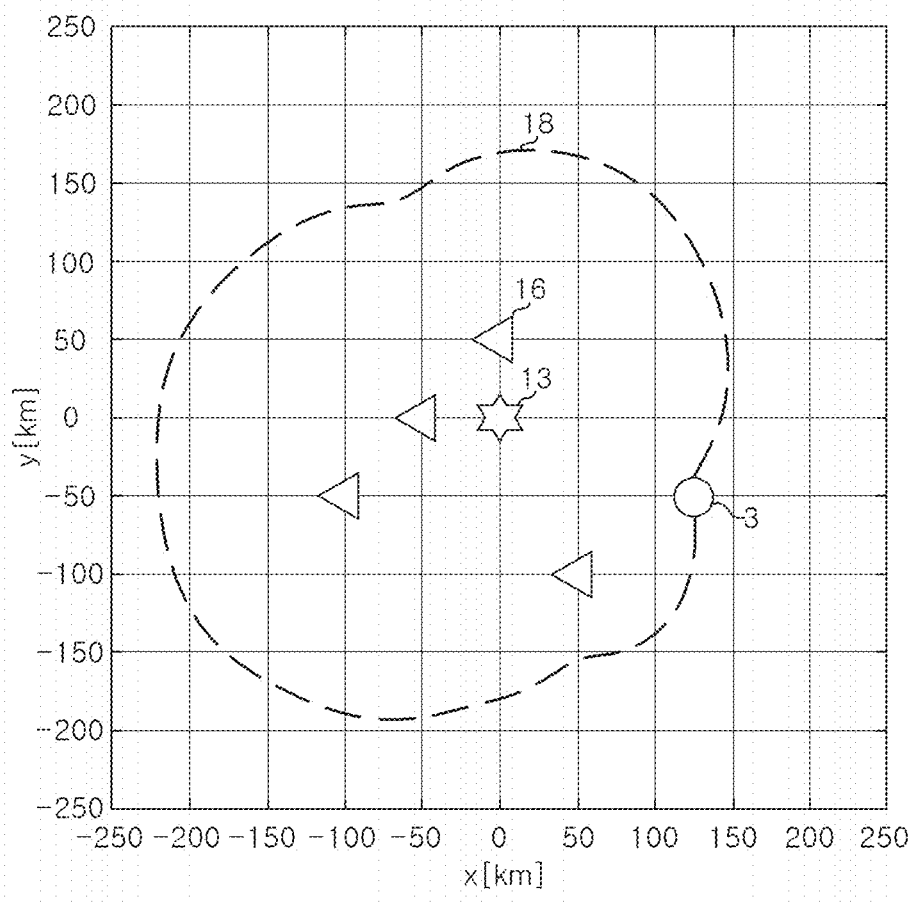
FIG. 9 is a diagram illustrating an example of an analysis result of a deception target settable area according to the embodiment of the present disclosure.

Then, the deception target settable area analysis (S450) is performed. The deception target settable area analysis is performed based on the location of the third transmission source 2 for each group, the reference position (or movement path) of the passive radar 1, and the actual target movement path. In the deception target settable area analysis, an area where the time delay ($T_j$) value is a negative (−) value is determined as a deception target non-settable area 18, and the subsequent process of setting the deception target movement path (S460) can be performed in an area where the time delay ($T_j$) value is a positive (+) value. FIG. 9 is an example of the result of performing the deception target settable area analysis (S450), and shows the result of performing the deception target settable area analysis at the instantaneous position of the target 3 by using the third transmission source jamming channels 16 corresponding to the first group in the example of FIG. 8.

Figure 10:
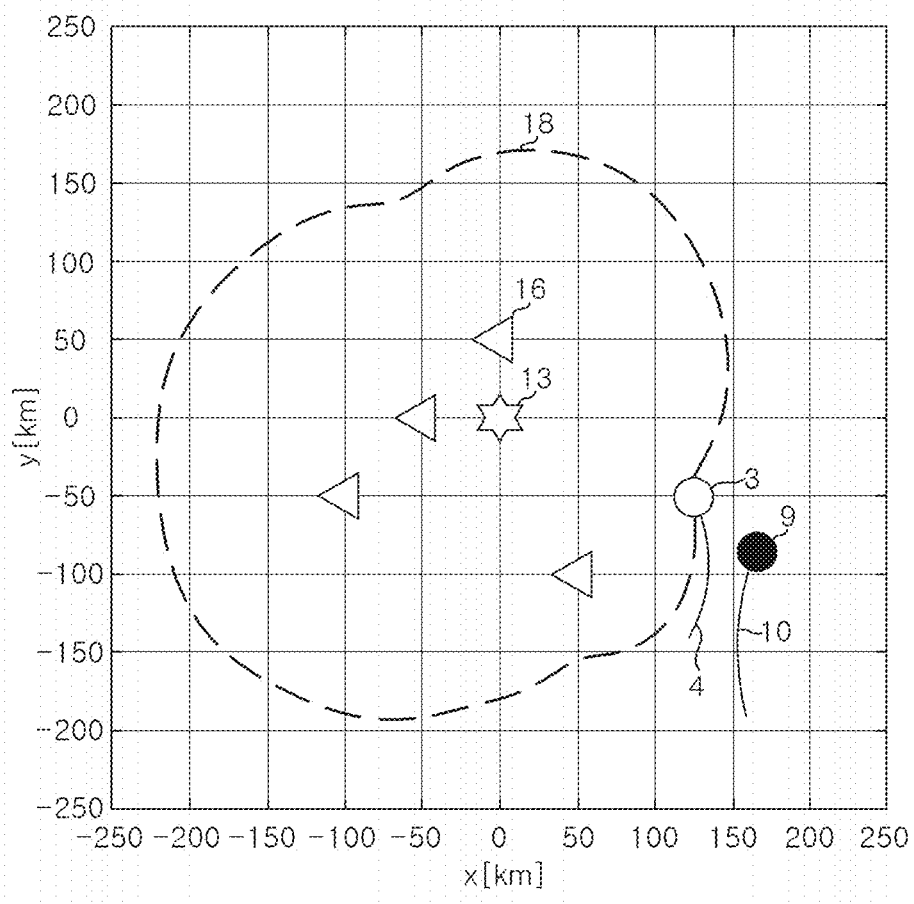
FIG. 10 is a diagram illustrating an example of setting a movement path of a deception target according to the embodiment of the present disclosure.

Thereafter, the deception target movement path setting (S460) is performed. In this process, the deception target movement path 10 is set as much as the actual target movement time in the deception target settable area analyzed for each set reference position (or movement path) of the passive radar 1 and for each grouped jamming channel group. In this case, it can be set in consideration of the deception speed and deception height of the deception target. FIG. 10 shows an example of setting the movement path of the deception target in the deception target settable area in the example of FIG. 9.

Then, the deception target information generation (S470) is performed. Through this process, the time delay ($T_j$) and the frequency offset ($F_j$), which are deception target information, are derived during the movement time of the actual target 3 using Equation 1 and Equation 2 based on the passive radar reference position (or movement path) for each set deception target movement path 10, the position of the third transmission source 2 in the group, the movement path 4 of the actual target 3, and the movement path 10 of the virtual deception target 9.

Referring to the example of the deception target information generation procedure of FIG. 4, as a final result, a total of M/N deception target movement paths and deception target information set are generated, but the number of jamming channel groups for one passive radar reference position (or movement path) can be set to be the same or different.

On the other hand, in a case that a part or all of the area where the deception target cannot be set is included in the movement path of the deception target, the time delay ($T_j$) and the frequency offset ($F_j$) values in a time point in which the case occurs and the corresponding jamming channel can be replaced with arbitrary values or random values.

In the method for generating deception target information according to the embodiment of the present disclosure, the order of detailed procedures may be changed according to the environment or the purpose of the operation.

Figure 11:
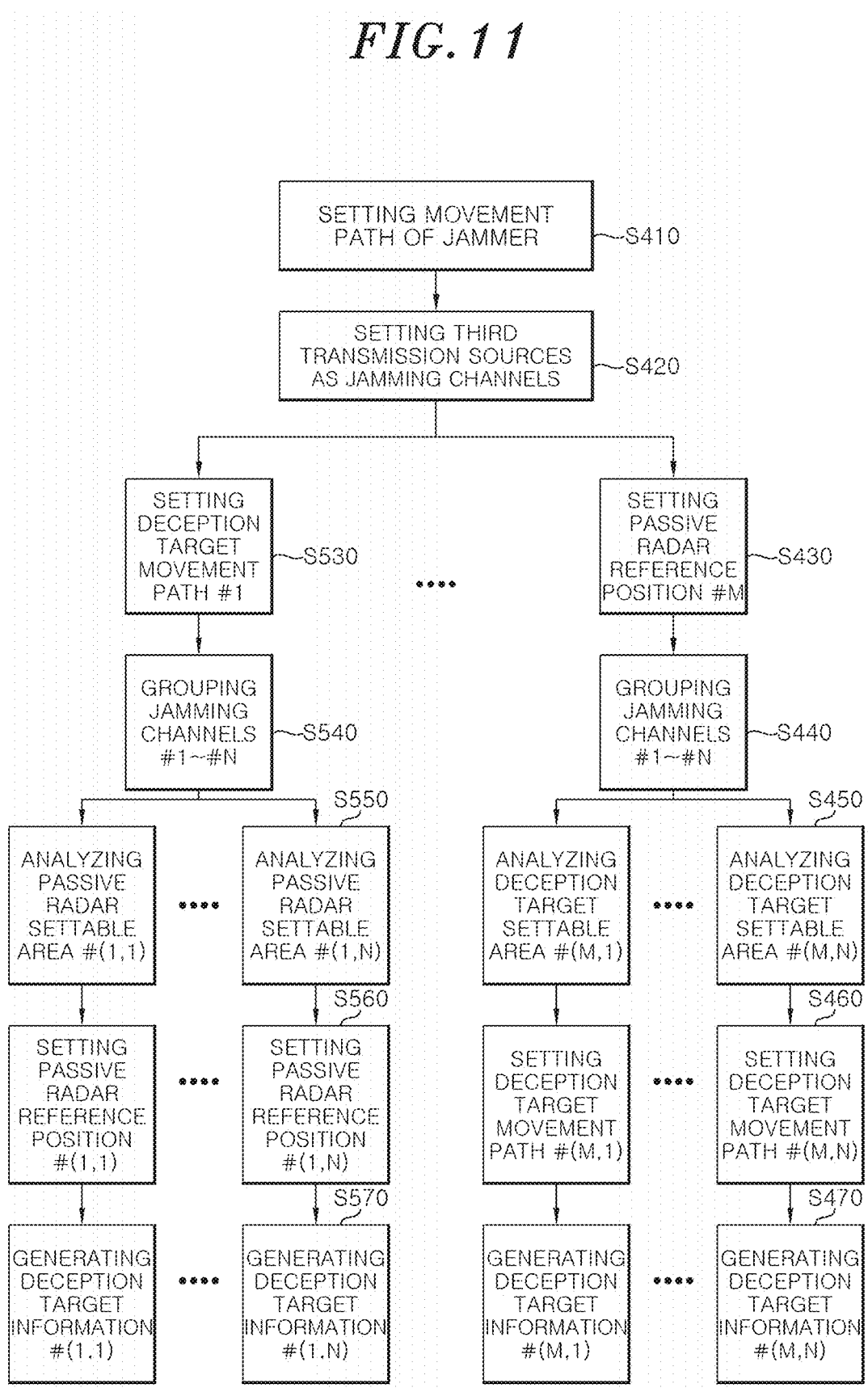
FIG. 11 is a diagram illustrating a modified example of a procedure for generating deception target information according to the embodiment of the present disclosure.

FIG. 11 is a flowchart illustrating a method for generating deception target information according to another embodiment of the present disclosure.

Referring to the modified procedure of FIG. 11, after the jammer movement path setting (S410) and the third transmission source jamming channel setting (S420) are completed, in at least one detailed procedure path among the detailed procedure paths, for example, in the first detailed procedure path, the deception target movement path setting (S530) is first performed at the desired location. Thereafter, the jamming channel grouping (S540) is performed, and the passive radar settable area analysis (S550) for each jamming channel group is performed in a similar manner to deception target settable area analysis (S450). Thereafter, the passive radar reference position setting (S560) is performed within the area where the passive radar can be set, and based on this, the deception target information generation (S570) is performed to derive a time delay ($T_j$) and a frequency offset ($F_j$). In this way, the same or different detailed procedures may be applied to the M detailed procedure paths according to the jammer operation environment or the operation purpose.

On the other hand, in the procedure for generating deception target information according to the embodiment of the present disclosure, if the movement path of the jammer is changed during operation of the jammer, the procedure is reset based on the changed movement path of the jammer, and accordingly, the deception target information can be automatically or manually regenerated based on a specific standard.

In addition, in the deception target information generation procedure according to the embodiment of the present disclosure, if the movement path of the jammer is not determined during jammer operation, the time delay ($T_j$) and frequency offset ($F_j$) values, which are the deception target information, may be created to be arbitrary values or random values.

If the deception jamming is performed using the deception target information generated according to the embodiment of the present disclosure as described so far, a plurality of false targets synchronized for each third transmission source used in the passive radar are generated, so that the passive radar detects the locations of the plurality of false targets. Accordingly, the operator cannot easily recognize whether the jamming is present on the operation screen of the passive radar.

In addition, false targets can be generated in the passive radar regardless of the presence or absence of prior information on the location of the passive radar, and it is possible to greatly increase the deception effect on the passive radar by generating the plurality of false targets by applying various methods.

In addition, by using this, the survivability of friendly fighters can be greatly improved in an area where passive radar is operated, and it can be used in defense fields such as radar and electronic warfare.

On the other hand, each step included in the method for generating deception target information for the passive radar deception jamming according to the above-described embodiment may be implemented in a computer-readable recording medium for recording a computer program programmed to perform these steps.

In addition, each step included in the method for generating deception target information for passive radar deception jamming according to the above-described embodiment may be implemented in the form of a computer program stored in a computer-readable recording medium programmed to perform these steps.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable recording medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for generating deception target information which is performed by an apparatus for generating deception target information, the method comprising:
    setting a plurality of transmission sources pre-selected based on a movement path of a jammer as jamming channels;
    setting a passive radar reference position to be used as a reference for deception jamming of a passive radar according to presence or reliability of prior information on a position of the passive radar for each of the set jamming channels;
    grouping the set jamming channels into a single group or a plurality of groups according to an operating environment and an operating purpose;
    analyzing a deception target settable area based on positions of the transmission sources, the passive radar reference position, and a movement path of an actual target for each group;
    setting a deception target movement path in a movement time of the actual target in the deception target settable area analyzed for each passive radar reference position and each jamming channel group; and
    deriving deception target information during the movement time of the actual target based on the passive radar reference position, the positions of the transmission sources of the corresponding group, the movement path of the actual target, and a movement path of a virtual deception target for each deception target movement path.

2. The method of claim 1, wherein in the setting of the passive radar reference position, the passive radar reference position is fixed based on the prior information in response to the reliability of the prior information on the position of the passive radar being equal to or greater than a preset threshold value.

3. The method of claim 1, wherein in the setting of the passive radar reference position, in response to the reliability of the prior information on the position of the passive radar being less than a preset threshold value, a plurality of the passive radar reference positions are set based on the prior information, a plurality of passive radar secondary reference positions where a location of the passive radar is expected are set, and a movement path of the passive radar is set by moving the passive radar reference position along the movement path of the actual target equipped with the jammer while maintaining a direction for the passive radar secondary reference position and a predetermined distance.

4. The method of claim 1, wherein in the setting of the passive radar reference position, in response to there being no prior information on the position of the passive radar, after the passive radar reference position is set arbitrarily, a movement path of the passive radar is set by moving the passive radar reference position along the movement path of the actual target equipped with the jammer while maintaining a predetermined direction and a predetermined distance.

5. The method of claim 4, wherein the predetermined direction is determined based on an expected position or direction of the passive radar or a position or direction where an installation of the passive radar is not expected.

6. The method of claim 4, wherein the predetermined direction is determined in consideration of an omnidirectional direction with respect to the actual target by setting the passive radar reference position at an isotropic interval.

7. The method of claim 4, wherein the predetermined direction is set based on a heading direction of the actual target according to a movement of the actual target equipped with the jammer.

8. The method of claim 1, wherein the grouping of the set jamming channels into the single or the plurality of groups comprises grouping the set jamming channels into a different number of groups for each reference passive radar set according to the operating purpose.

9. The method of claim 1, wherein the analyzing of the deception target settable area is performed at an instantaneous position of the actual target.

10. The method of claim 1, wherein the setting of the deception target movement path is performed in consideration of a deception speed and a deception height of the deception target.

11. The method of claim 1, wherein, in response to a part or all of a deception target non-settable area being included in the deception target movement path, the deriving of deception target information comprises replacing time delay and frequency offset values in the corresponding jamming channel at a time point of the part or all of the deception target non-settable area being included in the deception target movement path with arbitrary values or random values.

12. The method of claim 1, wherein after the setting of the plurality of transmission sources as jamming channels, a procedure of generating exceptional deception target information is performed in parallel with the setting of the passive radar reference position and the subsequent steps, and
    wherein the procedure of generating exceptional deception target information comprises:
        performing the jamming channel grouping after first setting the deception target movement path at a desired position by an operator;

setting the passive radar reference position within the passive radar settable area after analyzing the passive radar settable area for each jamming channel group; and deriving a time delay $T_J$ and frequency offset $F_J$ by performing generation of the deception target information based on the passive radar reference position.

13. An apparatus for generating deception target information, comprising:

a data acquisition unit configured to acquire various data for generating deception target information; and a processor configured to generate deception target information based on the various data acquired by the data acquisition unit, the processor further configured to:

set a plurality of transmission sources pre-selected based on a movement path of a jammer among the various data as jamming channels;

set, for each of the set jamming channels, a passive radar reference position to be used as a reference for deception jamming of a passive radar according to presence or reliability of prior information on a position of the passive radar among the various data;

group the set jamming channels into a single group or a plurality of groups according to operating environment and operating purpose among the various data;

analyze a deception target settable area based on positions of the transmission sources, the passive radar reference position, and a movement path of an actual target for each group;

set a deception target movement path in a movement time of the actual target in the deception target settable area analyzed for each passive radar reference position and each jamming channel group; and derive deception target information during the movement time of the actual target based on the passive radar reference position, the positions of the transmission sources of the corresponding group, the movement path of the actual target, and a movement path of a virtual deception target for each deception target movement path.

14. The apparatus of claim 13, wherein, in setting the passive radar reference position, the processor is configured to fix the passive radar reference position based on the prior information in response to the reliability of the prior information on the position of the passive radar being greater than or equal to a preset threshold.

15. The apparatus of claim 13, wherein in setting the passive radar reference position, in response to the reliability of the prior information on the position of the passive radar being less than a preset threshold value, the processor is configured to:

set a plurality of the passive radar reference positions based on the prior information, set a plurality of passive radar secondary reference positions where a location of the passive radar is expected, and set the movement path of the passive radar by moving the passive radar reference position along the movement path of the actual target equipped with the jammer while maintaining a direction for the passive radar secondary reference position and a predetermined distance.

16. The apparatus of claim 13, wherein, in setting the passive radar reference position, in response to there being no prior information on the position of the passive radar, the processor is configured to set the movement path of the passive radar by moving the passive radar reference position along the movement path of the actual target equipped with the jammer while maintaining a predetermined direction and a predetermined distance after arbitrarily setting a plurality of the passive radar reference positions.

17. The apparatus of claim 16, wherein the processor is configured to determine the predetermined direction based on an expected position or direction of the passive radar or a position or direction where an installation of the passive radar is not expected.

18. The apparatus of claim 16, wherein the processor is configured to determine the predetermined direction in consideration of an omnidirectional direction with respect to the actual target by setting the passive radar reference position at isotropic intervals.

19. The apparatus of claim 16, wherein the processor is configured to set the predetermined direction based on a heading direction of the actual target according to a movement of the actual target equipped with the jammer.

20. A non-transitory computer-readable recording medium storing instructions, when executed by a processor, causing the processor to perform a method, the method comprising:

setting a plurality of transmission sources pre-selected as jamming channels based on a movement path of a jammer as jamming channels;

setting a passive radar reference position to be used as a reference for deception jamming of a passive radar according to presence or reliability of prior information on a position of the passive radar for each of the set jamming channels;

grouping the set jamming channels into a single group or a plurality of groups according to an operating environment and an operating purpose;

analyzing a deception target settable area based on positions of the transmission sources, the passive radar reference position, and a movement path of an actual target for each group;

setting a deception target movement path in a movement time of the actual target in the deception target settable area analyzed for each passive radar reference position and each jamming channel group; and deriving deception target information during the movement time of the actual target based on the passive radar reference position, the positions of the transmission sources of the corresponding group, the movement path of the actual target, and a movement path of a virtual deception target for each deception target movement path.

* * * * *